Patented Dec. 20, 1927.

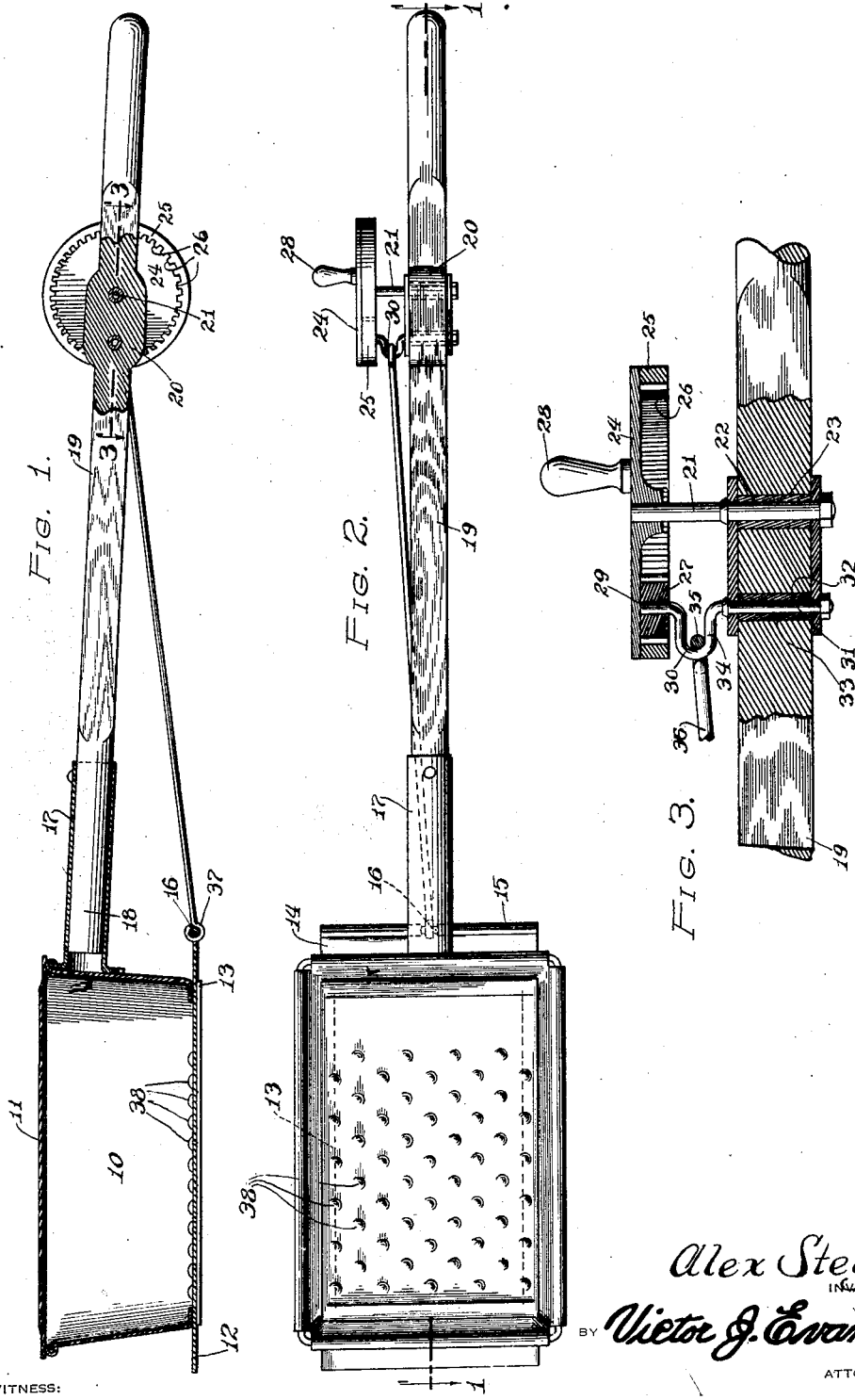

1,653,442

UNITED STATES PATENT OFFICE.

ALEX STEGER, OF VINING, MINNESOTA.

POP-CORN SHAKER.

Application filed February 18, 1927. Serial No. 169,292.

This invention relates to certain novel improvements in popcorn shakers and has for its principal object the provision of an improved construction of this character which will be highly efficient in use and economical in manufacture.

Among the several objects of the invention is the provision of a popcorn shaker having a reciprocal bottom whereby to agitate the popcorn seeds when in the process of being popped over a suitable fire.

A further object of the invention is to provide a popcorn shaker having a reciprocatory bottom operated by mechanism mounted upon the handle of the popcorn shaker whereby to agitate popcorn seeds in the process of being popped.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a longitudinal vertical sectional detail view of the invention;

Fig. 2 is a plan view of the same; and

Fig. 3 is an enlarged fragmentary sectional detail view taken substantially on line 3—3 of Fig. 1.

Referring to the drawings, 10 indicates the body of a popcorn shaker. This body 10 comprises a hinged top wall 11. The bottom of the body is opened and normally closed by a movable bottom wall 12. This wall 12 is supported for reciprocatory movement relative to the body 10 through the medium of inwardly turned flanges 13. The inner end portion 14 of the wall 12 is rolled to provide oppositely aligned sleeves 15 supporting a pin 16. The body 10 at its inner side wall has secured thereto in any well known manner, a socket 17 which receives an end portion 18 of a handle 19. The intermediate portion of the handle 19 is enlarged as at 20 to rotatably support a shaft 21. This shaft 21 is journaled through a bushing 22 mounted in a transverse opening 23 formed in the enlarged portion 20. The shaft 21 has fixed thereto, in any well known manner, a disk 24 which has an annular flange 25 formed on one side thereof. The inner annular surface of the flange 25 has teeth 26 formed therein and these teeth 26 are adapted to mesh with a gear 27. This gear 27 is adapted to rotate approximately three revolutions to one revolution of the disk 24.

Rotation of the disk 24 is accomplished by a handle 28 secured to the disk in any well-known manner.

The gear 27 is mounted on one end portion 29 of a crank shaft 30. The opposite end portion 31 of this crank shaft is journaled in a bushing 32 mounted in an opening 33 formed in the enlarged portion 20. Secured to the crank 34 through the medium of an eyelet 35 is a connecting rod 36. The opposite end portion of the connecting rod 36 is connected to the pin 16 through the medium of an eyelet 37.

The top surface of the bottom wall 12 has formed thereon a plurality of spaced protuberances 38 which function to agitate the popcorn seeds during the process of popping.

In use the popcorn shaker is held with its bottom wall 12 over a suitable fire or other heating element. The handle 19 at its outer end is firmly grasped in one hand to support the body 10 and its bottom wall over the heating agent. The other hand firmly grasps the handle 28 to rotate the disk 24. Upon rotation of this disk 24 the crank shaft will be caused to rotate and by reason of its connection with the bottom wall 12 through the medium of the rod 36 and pin 16 the bottom wall will be reciprocated relative to the body 10 whereby to shake or agitate the popcorn seeds within the body 10 upon the bottom wall 12.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In a popcorn shaker, a body including a reciprocatory bottom wall, a handle connected to the body, and operating means carried by the handle and connected to the body wall for reciprocating said wall, said operating means including an operating rod, means connecting one end portion of the operating rod to the bottom wall, a toothed disk rotatably supported by the handle, a gear operatively meshing with said toothed disk, a crank shaft rotatably supported by the handle, and means connecting the operating rod to the crank of said crank shaft.

2. In a popcorn shaker, a body including a movable bottom wall, and means for reciprocating said bottom wall relatively to the body, said bottom wall having a plurality of upwardly extending spaced protuberances formed thereon.

3. In a popcorn shaker, a body having a movable bottom wall and upwardly extending spaced protuberances formed on the bottom wall, a handle extending from the body, and operating means carried by the handle and operatively connected to the body wall for reciprocating said bottom wall relatively to the body.

In testimony whereof I affix my signature.

ALEX STEGER.